United States Patent [19]

Grünewald et al.

[11] Patent Number: 4,824,452
[45] Date of Patent: Apr. 25, 1989

[54] PROCESS FOR DESULFURIZING $CO_2$-CONTAINING GASES

[75] Inventors: Gerhard Grünewald, Mainz-Gonsenheim; Emil Alunic, Kronberg, both of Fed. Rep. of Germany

[73] Assignees: Metallgesellschaft Aktiengesellschaft, Frankfurt am Main; Linde Aktiengesellschaft, Hollriegelskreuth, both of Fed. Rep. of Germany

[21] Appl. No.: 156,279

[22] Filed: Feb. 16, 1988

[30] Foreign Application Priority Data

Feb. 17, 1987 [DE] Fed. Rep. of Germany ....... 3704882

[51] Int. Cl.$^4$ ................................................. F25J 3/00
[52] U.S. Cl. ............................................. 62/20; 62/17
[58] Field of Search ........................................ 62/17, 20

[56] References Cited

U.S. PATENT DOCUMENTS

| | | | |
|---|---|---|---|
| 3,453,835 | 7/1969 | Hochgesand | 62/17 |
| 4,561,869 | 12/1985 | Gazzi et al. | 62/20 |
| 4,563,202 | 1/1986 | Yao et al. | 62/20 |

FOREIGN PATENT DOCUMENTS

| | | |
|---|---|---|
| 1296133 | 2/1970 | Fed. Rep. of Germany . |
| 1544080 | 7/1975 | Fed. Rep. of Germany . |
| 1164407 | 9/1969 | United Kingdom . |

Primary Examiner—Ronald C. Capossela
Attorney, Agent, or Firm—Herbert Dubno

[57] ABSTRACT

Two different gases, which contain sulfur compounds and $CO_2$, are desulfurized with a physically acting solvent. The first gas is treated with the solvent in a first scrubbing zone, in which the sulfur compounds, particularly $H_2S$ and COS, are substantially completely removed and part of the $CO_2$ content in the gas is dissolved. At least part of the laden solvent leaving the first scrubbing zone is fed to a second scrubbing zone, which is supplied with the second gas, which has a lower $CO_2$ content than the first gas. The second gas is partly desulfurized in the second scrubbing zone and in a third scrubbing zone is subsequently treated with a solvent which is virtually free of sulfur compounds. The laden solvent leaving the third scrubbing zone is preferably fed to the second scrubbing zone.

6 Claims, 1 Drawing Sheet

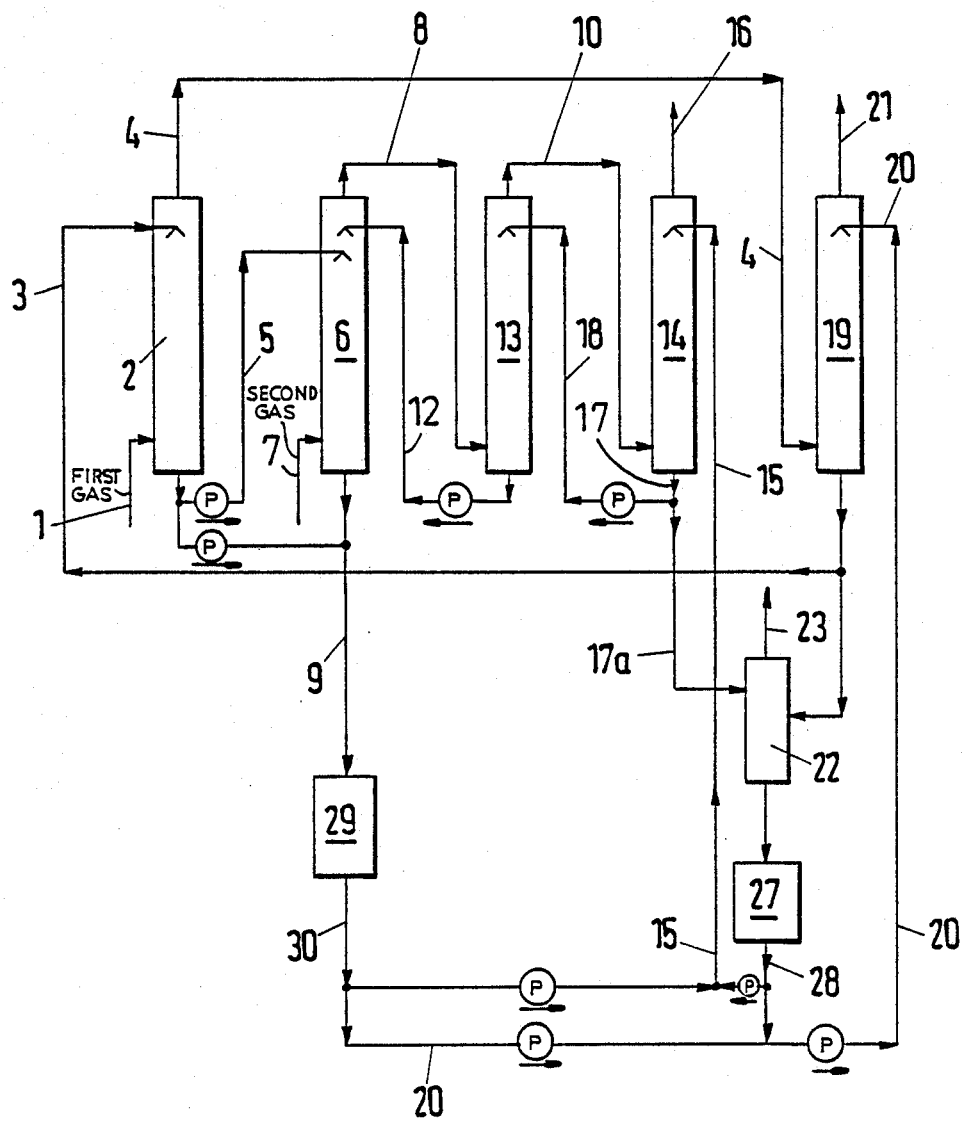

4,824,452

PROCESS FOR DESULFURIZING CO₂-CONTAINING GASES

FIELD OF THE INVENTION

Our present invention relates to a process for desulfurizing gases, in which the sulfur compounds, particularly $H_2S$ and COS, are scrubbed out with a physically acting solvent from the $CO_2$-containing gases and the solvent which is laden with the sulfur compounds is subsequently regenerated.

BACKGROUND OF THE INVENTION

German Patent No. 1,296,133 and the corresponding British Patent No. 1,164,407 as well as German Patent No. 1,544,080 and the corresponding U.S. Pat. No. 3,453,835 disclose the desulfurization of gases in processes in which physically acting solvents, such as methanol, xylene, N-methylpyrrolidone (NMP) and acetone are used.

The physically active solvents differ from chemically acting scrubbing solutions in that their dissolving or solubilizing power depends to a first approximation on the partial pressure of the substances to be absorbed and on the temperature at which the gas is scrubbed. The solubility of a gaseous substance increases as the temperature decreases and as the partial pressure increases. For this reason the solvent which is laden with sulfur compounds can be regenerated in known manner by a temperature rise and/or by a temperature relief.

In the known processes, difficulties arise because the solvents have no selective activity as regards the sulfur compounds but dissolve also other compounds, particularly $CO_2$, which are contained in the gases. The $CO_2$ content of the solvent will oppose a selective desulfurization so that more solvent will be required in the known processes.

OBJECTS OF THE INVENTION

It is an object of our invention to provide an improved process for the desulfurization of gases, especially two gases having different $CO_2$ contents, in such a manner that the rate at which solvent is to be regenerated is minimized.

It is also an object to provide a process in which the quantity of $CO_2$ which is co-absorbed with the sulfur compounds is minimized.

SUMMARY OF THE INVENTION

These objects are attained in a process having a first scrubbing zone with a solvent which substantially completely dissolves the sulfur compounds and partly dissolves the $CO_2$ that is contained in the gas.

At least part of the laden solvent which leaves the first scrubbing zone is fed to a second scrubbing zone, which is supplied with a second gas which has a lower $CO_2$ content than the first gas and is partly desulfurized in the second scrubbing zone.

The partly desulfurized gas leaving the second scrubbing zone is treated in a third scrubbing zone with a solvent which is virtually free of sulfur compounds.

If only part of the laden solvent leaving the first scrubbing zone is fed to the second scrubbing zone, the remaining laden solvent is directly fed to a regenerator for the solvent.

Because the second gas has a relatively low $CO_2$ content, it effects in the second scrubbing zone a certain desorption of the $CO_2$ from the solvent so that the temperature of the solvent is reduced and the absorption capacity of the solvent for the sulfur compounds is increased.

As a result, the gas leaving the second scrubbing zone is already sufficiently desulfurized and contains more $CO_2$ than the incoming gas. The total laden solvent which becomes available contains the absorbed sulfur compounds and has a relatively low $CO_2$ content. This fact will considerably facilitate the subsequent regeneration of the solvent resulting in an increase of the $H_2S$ concentration.

Another advantage is, in cases in which the first gas has a low COS content and the second gas has a high COS content, substantially all of the COS will be absorbed in the second scrubbing zone so that solvent at a relatively low rate will be sufficient for effecting the succeeding fine desulfurization in the third scrubbing zone and the costs of regenerating the absorbent will be further reduced.

In most cases the first and second gases differ in that the $CO_2$ content of the first gas is at least 1.5 times the $CO_2$ content of the second gas. By way of example it can be stated that the $CO_2$ content of the first gas is approximately in the range from 20 to 40% by volume and the $CO_2$ content of the second gas is about 2 to 15% by volume.

The first gas may consist of a shift-converted water gas and the second gas may consist of a water gas which has not been shift-converted. The main components of the water gas are hydrogen and carbon oxides.

The CO is entirely or substantially completely removed by the shift conversion reaction ($CO + H_2O = CO_2 + H_2$) and the shift conversion decreases also the COS content, which in the shift-converted water gas lies in the range from 2 to 30 ppm whereas the water gas which has not been shift converted contains about 50 to 1000 ppm COS. In general it can be stated that the COS content of the second gas is at least twice the COS content of the first gas and that both gases have an $H_2S$ content in the range from 0.1 to 3% by volume.

The known physically acting solvents can be used in the process, preferably methanol and n-methylpyrrolidone (NMP). The temperatures in the scrubbing zones are in the range from $+60°$ to $-80°$ C. and the pressures are in the range from 10 to about 100 bars.

The laden solvent leaving the third scrubbing zone can be fed to the second scrubbing zone because it has still an adequate activity for the partial desulfurization to be effected in the second scrubbing zone.

If the desulfurization gas leaving the third scrubbing zone has a $CO_2$ content which would disturb the further processing of said gas, the latter can be treated in a fourth scrubbing zone in which at least part of the $CO_2$ is absorbed. All or part of the resulting laden solvent can be fed to the third scrubbing zone.

Similarly, the $CO_2$ content of the desulfurized first gas leaving the first scrubbing zone can be removed in a fifth scrubbing zone, if required.

BRIEF DESCRIPTION OF THE DRAWING

The above objects, features and advantages of our invention will become more readily apparent from the following description, reference being made to the accompanying highly diagrammatic drawing in which the sole FIGURE is a flow diagram illustrating a plant for carrying out the method of the invention.

SPECIFIC DESCRIPTION

The gases to be treated consist of a first gas, which contains $H_2S$ and has a relatively high $CO_2$ content and a relatively low COS content, and of a second gas, which contains $H_2S$ and has a relatively low $CO_2$ content and a relatively high COS content. The $CO_2$ content of the first gas is at least 1.5 times the $CO_2$ content of the second gas. The COS content of the second gas is at least twice the COS content of the first gas.

The first gas is fed in line 1 to the first scrubbing zone 2, which is fed through line 3 with solvent which is substantially free of sulfur. In a manner known per se, the scrubbing zone 2 and the other scrubbing zones contain packing elements or exchange-promoting plates. The solvent consists of methanol or NMP.

The temperatures in the scrubbing zone 2 and in the remaining scrubbing zones are in the range from +60° C. to −80° C. and pressures from 10 to about 100 bars are maintained in the scrubbing zones.

A substantially completely desulfurized gas leaves the scrubbing zone 2 in line 4 and still has a substantial $CO_2$ content.

The second gas is fed in line 7 and is first treated in the second scrubbing zone 6 with laden solutions which are fed from scrubbing zones 2 and 13 in lines 5 and 12.

When the second gas has partly been desulfurized it flows in line 8 to the third scrubbing zone 13, in which a fine desulfurization is effected. The second gas which has been substantially completely desulfurized leaves the third scrubbing zone in line 10. If that gas has a $CO_2$ content which is excessive for the further use of the gas, the latter will be treated in a fourth scrubbing zone 14, which is fed with regenerated solvent from line 15. A gas which has been desulfurized and is substantially free of $CO_2$ is now available in line 16.

The solvent leaving the fourth scrubbing zone 14 in line 17 contains almost no sulfur compounds. For this reason a partial stream of said solvent is branched off in line 18 and is used for the desulfurization in the third scrubbing zone 13.

The remaining solvent conducted in line 17a is regenerated in known manner initially in a pressure relief zone 22, from which an exhaust gas that has a high $CO_2$ content is withdrawn in line 23. The solvent is then supplied to a regenerator 27, from which regenerated solvent is withdrawn in line 28. Pumps P are provided for solvent displacement.

If it is desired to remove the $CO_2$ from the sufficiently desulfurized gas in line 4, that gas will be fed to a fifth scrubbing zone 19, in which the gas is treated with regenerated solvent from line 20. The first gas which has been desulfurized and from which substantially all $CO_2$ has been removed is then available in line 21 for further use.

As is apparent from the drawing with laden solvents leaving the scrubbing zones 2 and 13 are fed to the second scrubbing zone 6 and are used for a partial desulfurization of the second gas. The spent solvent which contains sulfur compounds flows in line 9 to a regenerator 29, which may consist of a hot regenerator in a manner known per se and in which the sulfur compounds and the $CO_2$ content are substantially completely removed from the solvent.

Regenerated solvent is withdrawn in line 30 and part of it is fed together with regenerated solvent from the regenerator 27 in line 15 to the fourth scrubbing zone 14. The remaining regenerated solvent from the regenerator 29 and the remaining regenerated solvent from the regenerator 27 are fed in line 20 to the fifth scrubbing zone 19.

The third scrubbing zone may be arranged over and directly adjoin the second scrubbing zone 6 so that a structurally simple apparatus will be obtained.

If it is not desired to remove $CO_2$ from the gases flowing in lines 4 and 10, the fourth and fifth scrubbing zones 14 and 19 will be omitted as well as the pressure relief zone 22 and the regenerator 27. In that case the regenerated solvent flowing in line 30 will directly be distributed to the first and third scrubbing zones 2 and 13 and the lines 3 and 18 will be connected to line 30.

SPECIFIC EXAMPLE

A system which is in accordance with the drawing but in which the fourth and fifth scrubbing zones 14, 19 have been omitted is operated as follows:

Regenerated NMP at a rate of 100 m³/h is fed in line 3 to the first scrubbing zone 2. The same solvent at a rate of 70 m³/h is fed in line 18 to the third scrubbing zone. A pressure of 59 bars is maintained in both scrubbing zones. The first gas at a rate of 150,000 m³/h (STP) is fed to the first scrubbing zone. The second gas is fed to the second scrubbing zone 6 at a rate of 100,000 m³/h (STP).

Each of the first and second gases is at a temperature of about 40° C. The gases have the following composition:

|  | First Gas | Second Gas |
|---|---|---|
| $CO_2$ (% by volume) | 41.75 | 15.65 |
| $H_2$ + CO (% by volume) | 58.0 | 84.0 |
| $H_2S$ (% by volume) | 0.25 | 0.35 |
| COS (ppm) | 7 | 150 |

The purified gas in line 4 still contains about 1 ppm $H_2S$ and 5 ppm COS. The gs leaving the second scrubbing zone at a rate of 106,540 m³/h (STP) contains 21% by volume $CO_2$ and still contains 0.2% by volume $H_2S$ and 10 ppm COS. The desulfurized second gas is withdrawn in line 10 at a rate of 103,110 m³/h (STP) and contains only 7 ppm COS.

The solvent streams in lines 5 and 12 are at a temperature of 20° C. and have the following loadings (measured in m³/h (STP) solvent):

|  | Line 5 | Line 12 |
|---|---|---|
| Solvent rate (m³/h) | 100 | 70 |
| $CO_2$ | 106 | 46 |
| $H_2S$ | 3.75 | 3 |
| COS | 0.003 | 0.0045 |

The solvent to be regenerated is conducted in line 9 at a rate of 170 m³/h and has a temperature of 11° C. and per m³ contains 42 m³ (STP) $CO_2$ and 4.26 m³ (STP) $H_2S$.

The following important aspects are apparent from the Example. The gas in line 8 has a relatively high $CO_2$ content because part of the $CO_2$ contained in the solvent flowing in line 5 has been stripped off by the second gas in the second scrubbing zone 6. That stripping will also decrease the temperature of the solvent so that it will have a higher absorption of sulfur compounds.

As a result, the gas flowing in line 8 has partly been desulfurized and its COS content (10 ppm) has been decreased to less than 10% of the original value. For this reason the third scrubbing zone (13) for the remaining desulfurization can be designed for the removal of only $H_2S$ so that the solvent requirement of the third scrubbing zone will be substantially decreased. The desulfurized second gas flowing in line 10 has a larger volume than the second gas supplied in line 7 owing to the addition of $CO_2$ so that it has a higher energy for its further use, e.g., as a fuel gas in a gas turbine.

We claim:

1. A process for desulfurizing gases containing $CO_2$, $H_2S$ and COS which comprises the steps of:
    a) scrubbing a first gas containing $CO_2$, $H_2S$ and COS in a first scrubbing zone with a solvent capable of substantially completely solubilizing sulfur compounds contained in said first gas and which partially solubilizes $CO_2$ from said first gas to produce a laden solvent and a gas substantially free from sulfur compounds;
    b) scrubbing a second gas different from said first gas and which contains $CO_2$, $H_2S$ and COS but has a lower $CO_2$ content than said first gas with at least part of said laden solvent from said first scrubbing zone, in a second scrubbing zone, to produce a partly desulfurized gas and a solvent containing sulfur compounds with a lesser $CO_2$ content than said laden solvent;
    c) regenerating the solvent containing sulfur compounds produced in said second scrubbing zone; and
    d) scrubbing said partly desulfurized gas in a third scrubbing zone with a portion of said solvent which is substantially free from sulfur compounds.

2. The process defined in claim 1 wherein the $CO_2$ content of said first gas is at least 1.5 times the $CO_2$ content of said second gas.

3. The process defined in claim 1 wherein a sulfur containg solvent is recovered from said third scrubbing zone in step (d) and is fed to said second scrubbing zone.

4. The process defined in claim 1 wherein a gas is recovered from step (d) and said third scrubbing zone which has been desulfurized, said process further comprising the step of scrubbing the gas recovered from said third scrubbing zone in a fourth scrubbing zone with a portion of said solvent and in which the solvent in said fourth scrubbing zone dissolves $CO_2$ from the gas scrubbed therein, a $CO_2$ containing solvent being recovered from said fourth scrubbing zone and being fed to said third scrubbing zone as the solvent thereof.

5. The process defined in claim 1, further comprising the step of feeding the gas substantially free from sulfur compounds of step (a) to a further scrubbing zone receiving regenerated solvent from step (c) so that $CO_2$ from said gas substantially free from sulfur compounds is substantially completely dissolved in the regenerated solvent.

6. The process defined in claim 1 wherein said first and second gases are each a mixed gas consisting predominently of $H_2$ and carbon oxides and the COS content of said second gas is at least twice the COS content of the first gas.

* * * * *